United States Patent [19]
Hale

[11] 4,341,545
[45] Jul. 27, 1982

[54] BEADING APPARATUS FOR MAKING AN ELECTRON GUN ASSEMBLY HAVING SELF-INDEXING INSULATING SUPPORT RODS

[75] Inventor: John R. Hale, Lancaster, Pa.

[73] Assignee: RCA Corporation, New York, N.Y.

[21] Appl. No.: 258,739

[22] Filed: Apr. 29, 1981

[51] Int. Cl.[3] .............. C03C 27/02
[52] U.S. Cl. .............. 65/154; 65/155; 29/25.16; 29/25.19
[58] Field of Search .............. 65/154, 155; 29/25.16, 29/25.19, 25.2

[56] References Cited

U.S. PATENT DOCUMENTS 2,950,568 8/1960 Kissinger et al. .............. 65/155 X
3,340,035 9/1967 Hajduk .............. 65/154
3,363,298 1/1968 Merchant et al. .............. 29/25.16 X
3,527,588 9/1970 Aiken et al. .............. 65/154
3,561,083 2/1971 Sawagata .............. 29/25.16
3,609,400 9/1971 Marks .............. 313/70 C
4,169,239 9/1979 Ehata et al. .............. 315/16

*Primary Examiner*—Arthur D. Kellogg
*Attorney, Agent, or Firm*—Eugene M. Whitacre; Dennis H. Irlbeck; Vincent J. Coughlin, Jr.

[57] ABSTRACT

A beading apparatus for an electron gun assembly having a plurality of self-indexing insulating support rods with a plurality of indexing cavities formed in a surface thereof comprises at least two bead blocks. Each of the bead blocks has a beading support surface with a plurality of apertures formed therein. An indexing pin is disposed in each of the apertures. Each of the indexing pins has a reference end which extends beyond the beading support surface and projects into the indexing cavities of the insulating support rods. A vacuum is applied to the support rods to retain the support rods in contact with the indexing pins. In a second embodiment a support foot is used in conjunction with the vacuum to retain the support rods in contact with the indexing pins.

7 Claims, 11 Drawing Figures

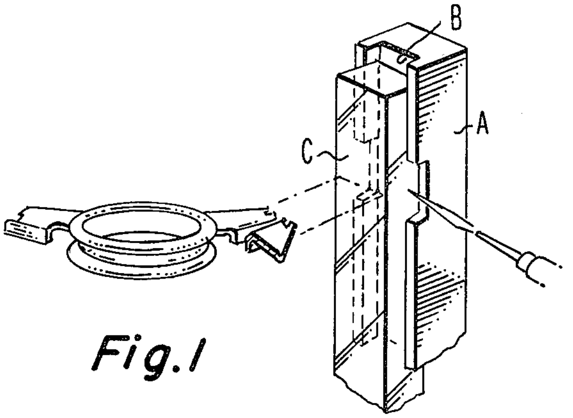
Fig.1
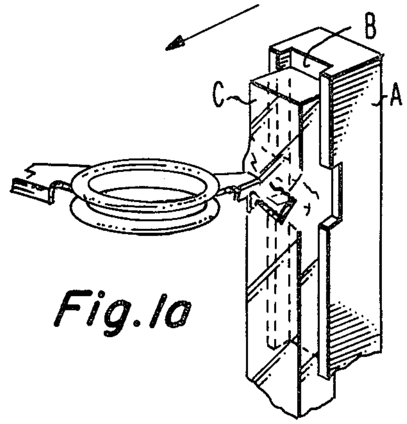
Fig.1a
Fig. 1b
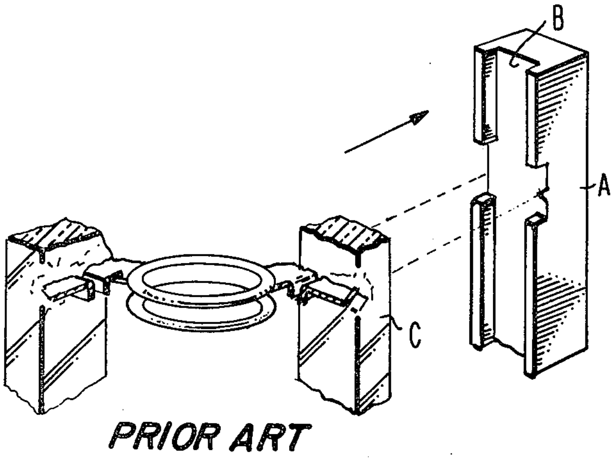
PRIOR ART
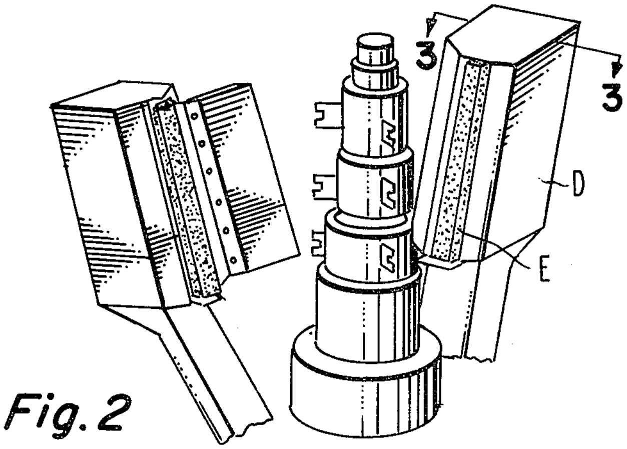
Fig.2
PRIOR ART
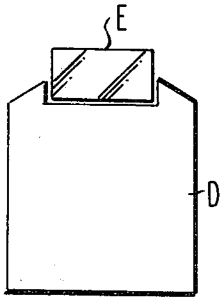
Fig.3
PRIOR ART

BEADING APPARATUS FOR MAKING AN ELECTRON GUN ASSEMBLY HAVING SELF-INDEXING INSULATING SUPPORT RODS

BACKGROUND OF THE INVENTION

The present invention relates to a beading apparatus for making an electron gun assembly, and particularly to a beading apparatus for making an electron gun assembly having insulating support rods with a plurality of indexing cavities formed therein.

The electrostatic lens elements of an electron gun assembly are serially arranged to accelerate and focus at least one electron beam along a generally longitudinally-extending electron beam path. The lens elements of the gun assembly are mechanically secured to at least a pair of generally longitudinally-extending insulating support rods by means of support tabs extending from the lens elements and embedded into the support rods.

The support tabs may be integral with the lens element or the support tabs may be attached, for example by welding, to the body of the lens elements. In either case, the portions of the support tabs embedded into the support rods include shaped projections or claws formed into the end of the support tabs to firmly anchor the tabs within the support rods. Attachment of the tabs to the support rods is accomplished in an operation called beading. One example of a beading apparatus is shown in U.S. Pat. No. 3,527,588 issued to Aiken et al., on Sept. 8, 1970. Occasionally, during the beading operation, one or more of the support rods became misaligned resulting in improper spacing between lens elements or resulting in incomplete coverage of the claw of the support tab by the insulating support rod. Either condition is undesirable and causes distortion of the electrostatic fields within the electron gun assembly which perturb the electron beam.

An early attempt to improve support rod alignment by reducing the lateral movement of the support rod is shown in U.S. Pat. No. 3,609,400 issued to Marks et al., on Sept. 28, 1971. In the Marks et al. structure, shown in FIGS. 1 and 1*a* of the present application, a beading block A includes a beading trough B in which the insulating support rod C is nested. The accuracy of the support rod alignment in the Marks et al. patent depends on the accuracy with which the width of the support rod can be controlled. The present industrial width tolerance for pressed multiform support rods up to 49 mm (millimeters) in length is ±0.254 mm. The arrows in FIGS. 1*a* and 1*b* serve to indicate the direction of motion of the beading block A during the beading operation.

A similar beading apparatus utilized to fabricate an electron gun structure of a pickup tube is shown in U.S. Pat. No. 4,169,239 issued to Ehata et al., on Sept. 25, 1979. The Ehata et al. structure is reproduced in FIGS. 2 and 3 of the present application. In Ehata et al., the insulating support rods E are supported on beading bases D which are rotated toward the stacked lens elements. As the Ehata et al. patent discloses, if the viscosity of the fused glass support rod is low, the accuracy with which the electrodes are assembled is decreased due to thermal and mechanical shock created at the time the molten supporting rod contacts the lens element support tabs.

It is also known in the art that a secure but somewhat random placement of the insulating support rod on the beading base can be accomplished by providing the beading base with a vacuum holding capability. In practice, when the support rod is held in the vertical position with a vacuum transducer, the vacuum retention force can be removed when the beading fires are turned on in order to eliminate gaseous combustion contamination. It has been found that the retaining force of the impinging gas flame is great enough to retain the support rod stationary in the vertical position. However, because of interrelated width tolerances between the support rod and the beading base, the support rod can be offset in a lateral direction during initial placement thereby resulting in a misalignment of the support rod.

In a recently developed electron gun assembly having at least two self-indexing support rods, each of the self-indexing support rods includes at least two indexing cavities formed in a surface of the support rods to align the rods during the beading operation. The indexing cavities permit the support rods to be beaded to the claws of the lens element support tabs without regard to the width tolerance of the support rods.

SUMMARY OF THE INVENTION

A beading apparatus for an electron gun assembly having a plurality of insulating support rods with a plurality of indexing cavities formed in a surface thereof comprises at least two bead blocks. Each of said bead blocks has a beading support surface with a plurality of apertures formed therein. An indexing pin is disposed in each of said apertures. Each of said indexing pins has a reference end which extends beyond said beading support surface and projects into said indexing cavities of said insulating support rods. Securing means retains said support rods in contact with said indexing pins.

BRIEF DESCRIPTION OF THE DRAWINGS

FIGS. 1, 1*a* and 1*b* are perspective views of a portion of an electron gun structure and a prior art beading apparatus showing techniques utilized in assembling the electron gun portion.

FIG. 2 is a perspective view of a portion of another embodiment of a prior art beading apparatus utilized in assembling an electron gun.

FIG. 3 is a top elevational view along section line 3—3 of the beading apparatus shown in FIG. 2.

DETAILED DESCRIPTION OF THE PREFERRED EMBODIMENT

Figure 5:
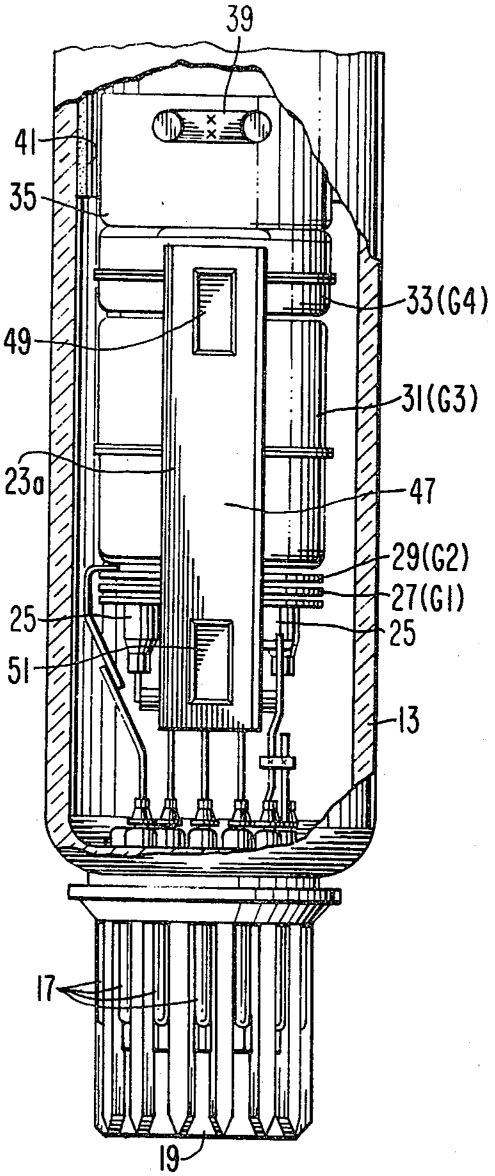
FIG. 5 is a broken-away, side, elevational view along lines 5—5 of the electron gun of FIG. 4.
Figure 4:
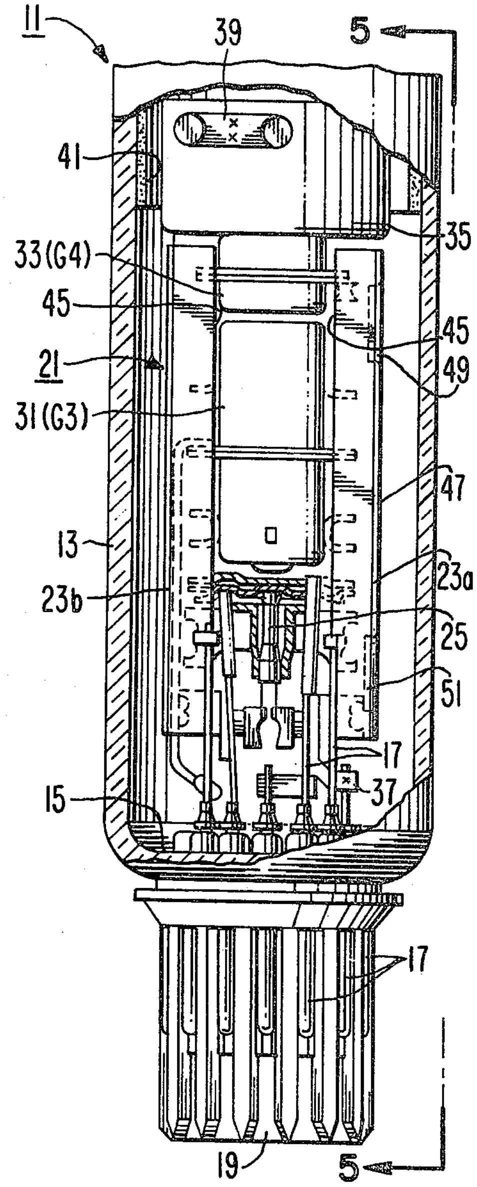
FIG. 4 is a broken-away, front, elevational view of an electron gun formed by the present novel beading apparatus.

FIGS. 4 and 5 show structural details of an electron gun assembly mounted in the neck of a cathode-ray, CRT tube. The electron gun assembly includes an evacuated glass envelope 11, which in a complete CRT includes a rectangular faceplate panel and a funnel having a neck 13 integrally attached thereto. A glass stem 15 having a plurality of leads or pins 17 extending therethrough is sealed to and closes the end of the neck 13. A base 19 is attached to the pins 17 outside the envelope 11.

An in-line beaded bipotential electron gun assembly 21, centrally mounted within the neck 13, is designed to generate and project three electron beams along coplanar convergent paths having a common, generally longitudinal direction toward a viewing screen. The gun assembly comprises two glass support rods or beads 23*a* and 23*b* from which the various electrodes are support to form a coherent unit in a manner commonly used in the art. These electrodes include three substantially equally transversely-spaced coplanar cathodes 25 (one for producing each beam), a control-grid electrode 27 (also referred to as G1), a screen-grid electrode 29 (also referred to as G2), a first accelerating and focusing electrode 31 (also referred to as G3), a second accelerating and focusing electrode 33 (also referred to as G4), and a shield cup 35, longitudinally-spaced in that order along the rods 23*a* and 23*b*. The various electrodes of the gun assembly 21 are electrically connected to the pins 17 either directly or through metal ribbons 37. The gun assembly 21 is held in a predetermined position in the neck 13 on the pins 17 and with snubbers 39 on the shield cups 35 which press on and make contact with an electrically-conducting internal coating 41 on the inside surface of the neck 13. The internal coating 41 extends over the inside surface of the funnel and connects to the anode button (not shown).

The support rods 23*a* and 23*b* have a mounting surface 45 and a beading support surface 47. A chamfer of about 30° is ground into both longitudinally-extending edges of the rods adjacent to the beading support surface 47 to facilitate the subsequent beading operation. The various electrodes 25–33 each include support tabs which are embedded into the mounting surface 45 of the support rods 23*a* and 23*b*. At least two indexing cavities 49 and 51 are formed into the beading support surface 47 of the support rods 23*a* and 23*b*. The indexing cavities 49 and 51 are located on the center line of the longitudinal bead axis. The indexing cavities 49 and 51 have the same lateral dimension; however, if one of the indexing cavities is of a different dimension than the other, a unique indexing can be achieved.

As shown in FIGS. 4 and 5, the indexing cavities 49 and 51, formed in the rods 23*a* and 23*b*, are substantially rectangular in shape and extend into the body of the rods to a depth of about 1.5 mm. The cavities 49 and 51 are typically about 5 mm long and about 3 mm wide. If the rods are fired or glazed with the indexing cavities 49 and 51 exposed to the glazing fires, the "as-pressed" geometry of the indexing cavities is not carried over into the fired rods. In this instance the cavities 49 and 51 take on a slight elliptical parabolic shape along both the major and minor axes of the rods. During the beading operation, the rods 23*a* and 23*b* are free-floating in the longitudinal direction because of the elongated indexing cavities 49 and 51, but constrained in the lateral direction.

Figure 6:
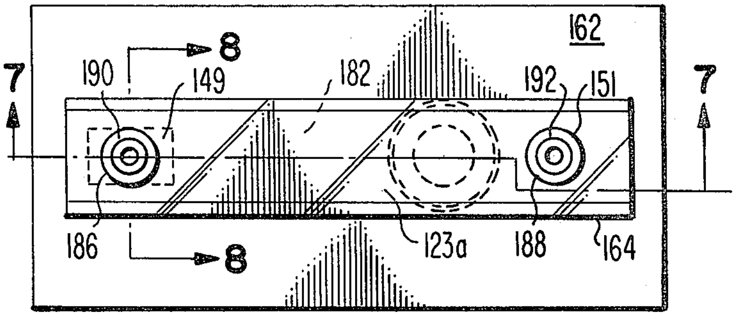
FIG. 6 is a plan view of a bead block of the present beading apparatus.
Figure 7:
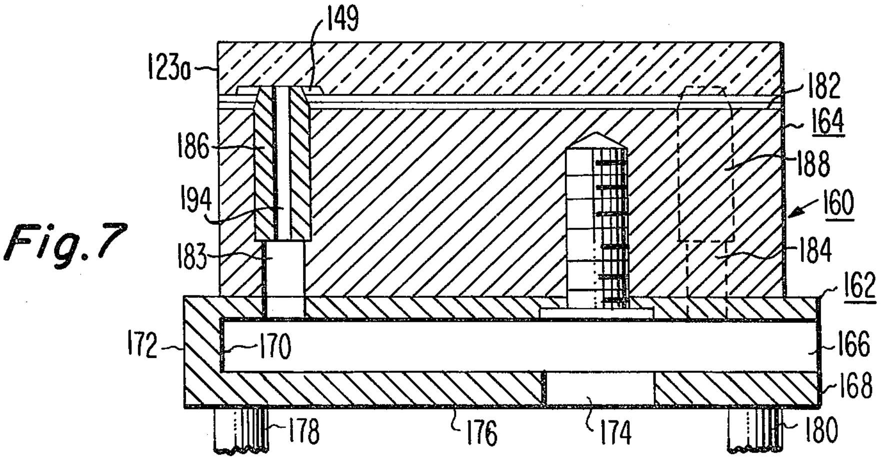
FIG. 7 is a side view along section line 7—7 of FIG. 6.

An alternative embodiment of a support rod 123*a* is shown in FIGS. 6 and 7 on a bead block which will be described hereinafter. In this embodiment, a first indexing cavity 149 has a longitudinal dimension greater than its lateral dimension while a second indexing cavity 151 is substantially circular and provides a minimum surface area configuration. In this embodiment, the support rod is constrained, during the beading operation, in both the longitudinal and lateral directions. At least one of the indexing cavities, for example cavity 149, should be free-floating in the longitudinal direction in order to eliminate a tolerance on the spacing between the indexing cavities 149 and 151. The indexing cavity 149 is typically about 5 mm long by about 3 mm wide, while the cavity 151 has a diameter of about 3 mm.

Figure 8:
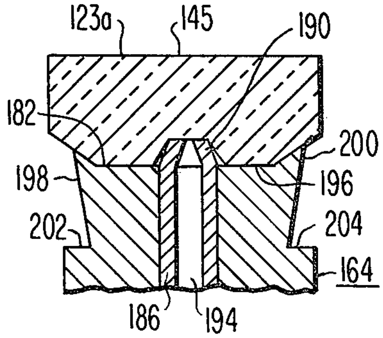
FIG. 8 is a fragmentary end view along section line 8—8 of FIG. 6.

In order to assembly electron guns using the self-indexing support rods 23*a* and 23*b*, or 123*a*, the gun and lens elements are stacked on a mandrel (not shown). By way of example, the support rod 123*a* is placed on a beading apparatus similar to that shown in the above-referenced Aiken et al. Patent, incorporated herein for disclosure purposes. The beading apparatus comprises at least two novel beading blocks 160. The beading blocks are disposed on opposite sides of the mandrel and are generally vertically disposed. The support rods 123*a* are affixed to the beading blocks 160 and heated to the beading temperature. When the support beads reach beading temperature, the bead blocks on the beading apparatus swing toward the mandrel until the support tab claws are embedded into the support rods 123*a*. One of the beading blocks 160 is shown in FIGS. 6–8. With reference to FIGS. 6 and 7, the beading block 160 comprises a base member 162 and a support pedestal 164. The base member 162 and the support pedestal 164 preferably are machined from a single piece of metal, such as stainless steel, or the pieces may be individually formed and detachably attached to form the bead block 160.

The base member 162 includes a conduit 166 formed therein, e.g., by drilling, and extending from an outer surface 168 longitudinally through the base member for a distance less than the length of the base member. The conduit 166 terminates at an internal wall 170 which is spaced from a second outer surface 172, opposite the outer surface 168. A thermocouple aperture 174 is formed in a bottom surface 176 of the base member 162 and extends into the support pedestal 164. A pair of support legs 178 and 180 extend from the bottom surface 176 of the base member 162 in order to permit the beading blocks to be vertically mounted on a pair of support frames (not shown) which may be pivoted toward the mandrel during the beading operation.

The support pedestal 164 of the beading block 160 includes a beading support surface 182 having at least two apertures 183 and 184 formed therein. The apertures extend through the support pedestal 164 and terminate in the conduit 166. The aperture 183 and 184 are aligned along the longitudinally-extending axis of the support surface 182.

A pair of indexing pins 186 and 188, having reference ends 190 and 192, respectively, are force fit into the apertures 183 and 184. The reference ends 190 and 192 of the indexing pins 186 and 188 are formed into a truncated pyramidal shape which extends beyond the beading support surface 182. The height of the reference ends 190 and 192 is set so that the ends project into the indexing cavities of the insulating support rod 123*a* and contact the support rod.

At least one, and preferably both, of the indexing pins 186 and 188 is provided with an indexing pin aperture 194 extending through the indexing pin, along the center-line of the pin. The pin aperture 194 permits a vacuum from an external source (not shown) to retain the support rod 123*a* in contact with the reference ends 190 and 192 of the indexing pins 186 and 188. The vacuum is transmitted through the base member conduit 166, through the support surface apertures 183 and 184 and through the indexing pin apertures 194 to the insulating support rod 123*a*. A thermocouple (not shown) for monitoring beading temperature is secured in a vacuum-tight fashion into thermocouple aperture 174. The conduit 166 has a width greater than the diameter of the thermocouple aperture 174 so that the vacuum is applied through aperture 183 and pin aperture 194.

A problem common in the prior art beading apparatus of FIGS. 1-3 is that of sublimation. The gas flame which impinges on the insulating support rods to heat the rods to beading temperature, drives off a residue which collects on the cooler surfaces of the beading apparatus and particularly on the adjacent surfaces of the beading blocks. The sublimation product, which is predominately potassium metaborate, has high solubility into the glass of the support rods. The resulting differential expansion causes crazing cracks in the support rods. The crazing cracks act as potential sources of glass particles within the tube. Applicant has virtually eliminated crazing cracks by structurally modifying the support pedestal 164 as shown in FIG. 8. The support pedestal 164 includes the beading support surface 182. The support surface 182 has a substantially trough-like contour with a substantially flat center protion 196 and a pair of outwardly-beveled (inclined about 30° above the flat central portion), upwardly-directed, longitudinally-extending sidewalls 198 and 200, respectively. The width of the support surface 182 is less than the width of the support beads 123*a* so that the sublimation product has no surface adjacent to the support bead on which to collect. In FIG. 8, the beading flame (not shown) impinges on the support rod 123*a* normal to the surface 145. To further insure that the sublimation product cannot build up on the support pedestal 164, a pair of reenterant notches 202 and 204 having an angle of about 10° from the normal extend longitudinally along the outside surface of each of the sidewalls 198 and 200, respectively.

Figure 9:
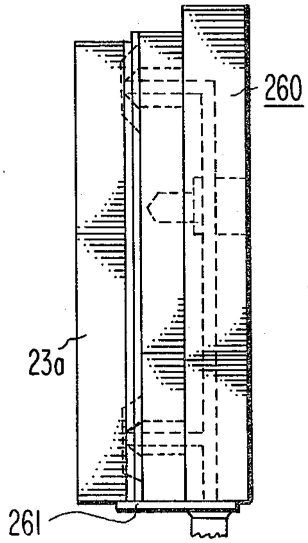
FIG. 9 is a side elevation view of another embodiment of a portion of the present novel beading apparatus.

FIG. 9 shows another embodiment of a novel beading structure. Only half of the structure is shown. An identical element forms the other half of the structure. In this embodiment, the beading structure comprises a bead block 260. The bead block 260 is identical to the bead block 160 shown in FIGS. 6-8 with the exception that a support foot 261 has been added to further restrict the longitudinal movement of the insulating support rod 23*a* having the substantially rectangular indexing cavities 49 and 51 formed therein. In this embodiment, the support rod 23*a* is secured and retained in contact with the indexing pins by both a vacuum retention force from an external source (not shown) and by the support foot 261 which limit the longitudinal movement of the support rod 23*a*.

What is claimed is:

1. In a beading apparatus for an electron gun assembly, said beading apparatus having at least two bead blocks, said gun assembly having at least two insulating support rods with a plurality of indexing cavities formed in a surface of each of said support rods, the improvement wherein each of said bead blocks comprises:

a beading support surface for supporting one of said insulating support rods, said beading support surface having a plurality of apertures formed therein, a plurality of indexing pins, each of said pins being disposed in a different one of said apertures, each of said indexing pins having a reference end extending beyond said beading support surface and projecting into said indexing cavities of one of said insulating support rods, and securing means for retaining each of said support rods in contact with said indexing pins.

2. The structure as in claim 1, wherein said bead blocks include a base member and a support pedestal, one surface of said support pedestal comprises said beading support surface, said support surface has a substantially trough-like contour with a substantially flat center portion and a pair of outwardly-beveled, longitudinally-extending sidewalls projecting above said flat center portion.

3. The structure as in claim 2, wherein said support pedestal has a reenterant notch extending longitudinally along an outside surface of each of said sidewalls adjacent to said beading support surface.

4. The structure as in claim 1, wherein at least one of said indexing pins disposed in said apertures in said beading support surface includes an indexing pin aperture extending through said pin along the center-line thereof.

5. The structure as in claim 4, wherein said securing means includes vacuum-retaining means transmitted through a conduit formed in said base member, said conduit communicating with said apertures in said beading support surface and with said pin aperture in at least one of said indexing pins.

6. The structure as in claim 1, wherein said reference end of said indexing pins projecting into said indexing cavities of said insulating support rods has a truncated pyramidal shape.

7. The structure as in claim 5 further including a support foot attached to one end of said bead blocks extending beyond said beading support surface of said blocks.

* * * * *